United States Patent Office 2,831,772
Patented Apr. 22, 1958

2,831,772

BEVERAGE PREPARATION

Irving I. Herz, White Plains, N. Y., assignor to Afico S. A., Lausanne, Switzerland, a corporation of Switzerland No Drawing. Application March 22, 1956
Serial No. 573,105

12 Claims. (Cl. 99—77)

This invention is that of a solid tea essence or a tea essence concentrate that dissolves readily in cold water, and to the resulting aqueous solution of which ice can be added in making iced tea. Also part of the invention is the method of preparation of such concentrate or solid tea essence.

I have prepared hot clear liquid tea essence in the usual manner, for example, by brewing tea leaves with boiled water or percolating such water repeatedly over them. I have noticed, however, that after I dried the resulting liquid essence under conditions avoiding decomposing its organic content, and then added cold water to try to dissolve the resulting dry tea essence, a considerable portion of it would not dissolve. That cold water insoluble fraction of the tea essence floated about in the water in apparently flocculent form. It gave the liquid product an unattractive appearance and undesirable character.

I have also noticed, when the hot clear liquid tea essence was cooled to room temperature and lower, for example, to a temperature approaching that of iced tea, that that water-insoluble fraction separated out and likewise floated about in the water in the apparently flocculent form.

With some blends of teas, for example, orange pekoe, the cold water insoluble portion of the clear hot liquid essence was about forty-three percent of the total originally dissolved solids when the essence was cooled to between 32 and 40° F. It varies with different species and blends of teas. In some teas it may be about twenty percent of its total originally dissolved solids.

Eventually I discovered that this ordinarily cold water insoluble fraction of tea essence is rendered water-soluble by treating it with a sufficient amount of a systemically innocuous water soluble sulfite to render that fraction soluble in cold water.

Thus, considered broadly the method of the invention comprises preparing a hot clear liquid tea essence in any of the usual ways, and treating the tea essence with a sufficient amount of a systemically innocuous water-soluble sulfite to render the cold water insoluble fraction of the solids of the essence soluble in cold water. This treatment is advantageously done at elevated temperature, for thereby the necessary time is unusually practical.

By a "systemically innocuous sulfite" is meant one that will cause no toxic injury when consumed in the concentration, amount and frequency in which it might be taken in the ordinary drinking of such tea.

By a "water-soluble sulfite" is meant sulfurous acid (whether added as such or as produced by the introduction of sulfur dioxide into the aqueous liquid essence), and an alkali metal, for example, sodium or potassium sulfite or bisulfite or ammonium sulfite or bisulfite, or mixtures of any of these sulfites.

By the cold water insoluble fraction of the clear hot liquid tea essence is meant that part of the solids generally dissolved in the hot liquid essence, that is insoluble in its water when the tea essence is cooled, for example, to a temperature in the range between about room temperatur and that just above which freezing would occur. In "cold water soluble" is intended soluble in cold water whose temperature is within that same range.

It is generally advantageous to add the water-soluble sulfite to the water used in making the essence or to the clear hot liquid essence. In that way, the rendering of the ordinarily cold water insoluble fraction of the essence cold water soluble is expedited. However, the sulfite can be added to the liquid essence after its temperature has fallen below that at which it was prepared.

The sulfite can even be added after the essence has cooled far enough for the cold water insoluble fraction to begin to separate out. In that event, if the ordinarily cold water insoluable material does not readily completely dissolve, it is desirable to elevate the temperature of the mixture to expedite dissolution of that fraction. It is also possible to cool the original tea essence far enough to throw down practically all of the cold water insoluble fraction of its solids, then to filter off that fraction, and treat it in aqueous medium with the sulfite, advantageously at elevated temperature, and thereby render it water-soluble. The resulting aqueous solution of that fraction then can be added to the filtrate left when the cold water-insoluble fraction was filtered off from the original essence. These various modifications also are included when reference is made to the step of treating the essence with a water-soluble sulfite.

After the selected systemically innocuous sulfite has been dissolved in the aqueous essence, the resulting essence containing the dissolved sulfite is held, for example, at a temperature of about fifty degrees centigrade for a time sufficient to render cold water soluble the ordinarily cold water insoluble fraction of the essence, such as for about fifteen minutes.

The quantity of water-soluble sulfite to use in relation to the solids content of the original essence, or to the cold water insoluble fraction of it, cannot be given within a fixed range because of the variations between teas of different species and from different environs, and even from season to season as to any species at a specific environment and the variations in blends, and, in any event, the type and extent of brewing or percolation.

The proportion of sulfite to the total solids in the essence should be sufficient to render cold water soluble the ordinarily cold water insoluble fraction of the solids dissolved in the orginal clear hot liquid tea essence. With some teas the proportion of the sulfite can vary between from about two to about fifteen percent (calculated as anhydrous sodium bisulfite) of the total solids of the essence, and perhaps better between from about four to about twelve percent, or advantageously about five to about ten percent.

The specific amount to use for any particular essence can be determined readily by those skilled in the art by some one of several possible quick test checks on the particular essence. For example, a specific test sample quantity of essence can be cooled to below 10° C. but above zero until its cold water insoluble fraction is thrown out of solution. The mixture then is stirred to homogeneity and a handful of aliquot portions measured out. To each a different measured quantity of a definite concentration aqueous solution of a suitable water-soluble sulfite is added. Each such sample with its added sulfite is heated, for example, to at least about 165° F. and then similarly cooled down to below room temperature to see whether the cold water insoluble material was solubilized. For a closer indication, a further aliquot portion can be so tested with a quantity of the sulfite solution between the amount that did solubilize and the nearest that did not.

In essence, that test is much in the nature of a titration. One skilled in the art thus readily can determine the amount of sulfite to use, by that method or some other that readily suggests itself. In this way there can be closely determined the quantity of the sulfite to use on any particular essence.

If in any run an excess of the sulfite may have been used toward the end of being certain that all of the ordinarily cold water insoluble fraction would thus be rendered completely cold water soluble, such excess can be reduced, if desired or necessary, by adding a suitable quantity of an oxidizing agent that does not introduce any nocuous solute. An oxidizing agent which introduces no additional soluble material, such as hydrogen peroxide or oxygen or ozone, is most advantageous so far as presently indicated. However, others such as an alkali metal peroxide as sodium or potassium peroxide can be used.

The essence, thus treated with either the required amount of a suitable sulfite or with an amount of sulfite and a suitable amount of the oxidizing agent to reduce any excess sulfite, then is dried by a suitable method to avoid decomposition of the essence. For example, it may be concentrated by boiling to a minor part of its original volume, for example, to about thirty or even twenty-five percent of its original volume and then taken to dryness under vacuum at a lower temperature, or by spray-drying. Alternatively, it may also be spray dried from its original concentration, or dried by vacuum from the frozen state, for example, as by lyophilization.

Thus, the invention includes also a cold water soluble solid tea essence that dissolves in cold water to give a clear liquid essence solution, to which ice can be added to make iced tea. Considered somewhat more specifically from the product aspect, the invention includes a cold water soluble tea essence having its ordinarily cold water insoluble fraction in a form rendered cold water soluble by treatment with a sufficient amount of a systemically innocuous sulfite to render it cold water soluble.

The dry tea essence can be had in a (generally free flowing form) small particle size, for example, when dried by spray drying. This form or any other form of the dry finished solid tea essence can be tabletted into tablets or pellets of suitable sizes and shapes, for example, of a size such that one tablet or pellet is sufficient to give a glass of iced tea of a strength that is commonly used.

The free flowing form of the solid tea essence, for example, as obtained by spray drying can be admixed with powdered or granulated sugar and the mixture tabletted or pelletted. The proportion of sugar to tea can be such that one tablet or pellet contains enough of the tea and the sugar respectively to give a glass of iced tea of commonly used strength and sweetness.

The invention may be illustrated by, but not restricted to, the following examples:

*Example 1.*—Fifty-six liquid ounces of boiling hot water were repeatedly percolated over one-half pound of orange pekoe tea leaves (held in the perforated ground coffee holder) for about fifteen minutes in an ordinary coffee percolator wherein the water is boiled in the bottom compartment and, by the steam generated in the boiling body of water, water is propelled up through the central hollow shaft (that supports the perforated ground coffee holder) and after striking the underside of the percolator cover, drops down over and percolates through the disintegrated material held in the perforated holder. Thirty liquid ounces of hot clear tea essence were obtained. To this amount of this essence, four grams of anhydrous sodium bisulfite were added and stirred in to dissolve it. The solution then was boiled for just over twenty minutes.

The resulting tea essence with its ordinarily cold water insoluble fraction thus rendered water-soluble by the treatment with the sulfite was boiled gently to reduce its volume to about fifteen fluid ounces. The drying then was completed by heating the thus concentrated liquid essence in its container over the steam-bath and applying also twenty inches of vacuum to the container.

*Example 2.*—An ordinary aqueous tea extract was made by extracting two hundred and fifty grams of tea leaves with fifteen hundred grams of hot water. After separating the extract from the leaves, one thousand grams of clear hot extract were obtained, containing fifty grams of dissolved tea solids. This extract was then chilled to 20° C. This resulted in the precipitation of ten grams of solids consisting chiefly of tannins. The thus precipitated solids were separated by filtration from the aqueous fraction of this aqueous tea extract.

The precipitated and separated solids, whose weight was ten grams, were mixed with thirty cubic centimeters of an aqueous solution containing ten percent by weight of sodium sulfite. This mixture was heated at the boiling temperature or below for about seventy-five minutes to bring about a homogeneous solution of these solids.

When this solubilizing step was completed, the solution contained an excess of unreacted sodium sulfite. This excess was oxidized by adding and stirring in hydrogen peroxide solution at 20° C., thus converting that excess to sodium sulfate.

This solution of the solubilized solids was added to the aqueous fraction of the original tea extract, and the resulting total solution was reduced to dryness by spray drying.

*Example 3.*—The aqueous tea extract was prepared as in Example 2. Sodium sulfite was then dissolved in the hot tea extract at about its boiling temperature to the extent of about seven and one-half (7.5%) percent of the weight of the tea solids in the extract. The resulting solution was kept at 90 to 99° C. for about seventy-five minutes to solubilize the fraction of its dissolved tea solids which is insoluble in water at 20° C. Then the excess of sodium sulfite was oxidized with hydrogen peroxide as in Example 2. Thereafter, the thus treated tea extract in which all of its solids had thus been solubilized was dried by spray drying.

The resulting thus dried tea essence solids dissolve clearly in tap water, for example, at 20° C., and remains clear on adding ice in making iced tea from it.

In the foregoing examples, the specific tea blend can be replaced by any other. The sodium bisulfite or sulfite can be replaced by the equivalent or required amount of sodium sulfite or bisulfite respectively, or by any other bisulfite or sulfite disclosed as applicable, or advantageously by sulfurous acid as such or as produced by introducing sulfur dioxide into the water in the tea essence. The use of sulfurous acid, whether as such or produced in the water of the essence, does not add any cation, and any excess of it ordinarily can be boiled off.

This water-soluble tea essence also can be prepared in the form of an aqueous concentrate of any suitable concentration, for example, as indicated in Example 1 by concentration to any selected suitable concentration and omitting the drying step. For example, the essence can be concentrated to the point where it contains at least about twenty-five percent dissolved tea essence solids. The resulting concentrate, of any selected suitable concentration, dissolves clearly in tap water and remains clear on adding ice water in making iced tea from it.

Instead of adding ground sugar to the finely divided dry tea essence solids, the desired proportion of sugar or other water-soluble carbohydrate can be dissolved in the tea essence, preferably after the sulfite treating step, and then concentrated or dried with the tea essence.

While the invention has been explained by describing in detail certain specific embodiments of it, is is understood that various substitutions and modifications can be made in them within the scope of the appending claims which are intended also to cover equivalents of the specific embodiments.

What is claimed is:

1. The method of preparing a highly concentrated tea essence that readily dissolves in cold water, to the resulting aqueous solution of which ice can be added to make iced tea, which method comprises preparing a hot clear liquid tea essence from tea leaves by treating them with hot water by a step selected from the class consisting of brewing and percolation; and dissolving in said aqueous tea essence an amount of a systemically innocuous sulfite sufficient to render soluble in cold water the ordinarily cold water insoluble fraction of the tea essence, and concentrating the tea essence containing the thus treated fraction.

2. The method as claimed in claim 1, wherein there is prepared a final solid tea essence that dissolves readily in cold water, by concentrating said liquid tea essence by evaporating the liquid portion of said liquid tea essence until only solids remain.

3. The method as claimed in claim 2, wherein the drying is conducted in a manner to yield the resulting dry tea essence solids in small particle size.

4. The method as claimed in claim 3, wherein the tea essence with its ordinarily cold water insoluble fraction rendered cold water soluble is reduced to the dry, solid state by spray drying.

5. The method as claimed in claim 1, wherein any excess sulfite is reduced by adding to the sulfite-treated liquid tea essence an amount of a systemically innocuous oxidizing agent sufficient to counteract the excess sulfite.

6. The method as claimed in claim 5, wherein the oxidizing agent is one which introduces no solids into the sulfite treated liquid tea essence.

7. The method as claimed in claim 6, wherein the sulfite is one which introduces no solids into the liquid tea essence.

8. The method as claimed in claim 1, wherein, after the sulfite is dissolved in the aqueous essence, the resulting solution is held at elevated temperature for a time sufficient for the sulfite to render cold water soluble the ordinarily cold water insoluble fraction of the tea essence.

9. The method as claimed in claim 8 wherein the solution resulting after the addition of the sulfite is held at at least fifty degrees centigrade.

10. The method as claimed in claim 9, wherein the solution is held at about fifty degrees centigrade for about fifteen minutes.

11. The method of preparing a highly concentrated tea essence which comprises the method as claimed in claim 1, wherein the sulfite is added to and dissolved in the water used for preparing the initial liquid tea essence from the leaves.

12. The method of preparing a concentrated tea essence as claimed in claim 1, wherein the originally prepared hot clear liquid tea essence is chilled to precipitate the cold water insoluble fraction of the essence, and the insoluble fraction is separated from the aqueous solution containing the cold water soluble fraction and treated, to render it soluble in cold water, in an aqueous medium containing an amount of a systemically innocuous sulfite sufficient to render soluble in cold water the ordinarily cold water insoluble fraction, and combining the thus rendered cold water soluble fraction with the other fraction.

References Cited in the file of this patent

UNITED STATES PATENTS

| | | |
|---|---|---|
| 1,854,062 | Potter | Apr. 12, 1932 |
| 2,235,700 | Eldred | Mar. 18, 1941 |

FOREIGN PATENTS

| | | |
|---|---|---|
| 18,612 | Great Britain | of 1906 |
| 165,644 | Great Britain | July 7, 1921 |